United States Patent [19]

Atkin

[11] Patent Number: 4,457,736
[45] Date of Patent: Jul. 3, 1984

[54] FLEXIBLE COUPLINGS
[75] Inventor: Howard S. Atkin, Sutton Coldfield, England
[73] Assignee: Dunlop Limited, London, England
[21] Appl. No.: 341,271
[22] Filed: Jan. 21, 1982
[30] Foreign Application Priority Data
  Jan. 31, 1981 [GB] United Kingdom ............... 8103033
[51] Int. Cl.³ .............................................. F16D 3/00
[52] U.S. Cl. ..................................... 464/85; 464/132
[58] Field of Search ............... 464/129, 128, 130, 132, 464/136, 85, 135, 81, 70

[56] References Cited
U.S. PATENT DOCUMENTS

| | | | |
|---|---|---|---|
| 1,443,969 | 2/1923 | Thiemer | 464/136 |
| 1,707,309 | 4/1929 | Leipert | 464/135 |
| 1,855,640 | 4/1932 | Lord | 464/132 |
| 1,881,326 | 10/1932 | Peters | 464/132 |
| 2,336,579 | 12/1943 | Venditty | 464/70 |
| 2,777,306 | 1/1957 | Wildhaber | 464/132 |
| 2,975,621 | 3/1961 | Moulton | 464/132 |

FOREIGN PATENT DOCUMENTS

| | | |
|---|---|---|
| 1236657 | 6/1971 | United Kingdom . |
| 1482231 | 9/1977 | United Kingdom . |
| 2008717 | 6/1979 | United Kingdom . |
| 2018395A | 10/1979 | United Kingdom . |
| 1582208 | 7/1981 | United Kingdom . |

Primary Examiner—John M. Jillions
Attorney, Agent, or Firm—Stevens, Davis, Miller & Mosher

[57] ABSTRACT

A flexible coupling for connecting drive and driven shafts comprising four radially extending bushes uniformly spaced in a circumferential direction with respect to the axis of rotation of the coupling. Opposed pairs of bushes are connected to a respective one of the shafts and alternate pairs of adjacent bushes are connected by a respective web. The webs serve to transmit torque and accommodate axial movement between the shafts.

14 Claims, 5 Drawing Figures

FLEXIBLE COUPLINGS

This invention concerns improvements in or relating to flexible couplings for connecting two rotatable components, for example driving and driven shafts.

Flexible couplings are known, for example from U.K. Pat. No. 808,807, comprising a spider having four mutually perpendicular limbs, a rubber bush bonded to each limb, a shell surrounding each bush and means for securing opposite shells to yokes carried by the shafts to be connected. Although such known couplings have excellent torque transmitting capability they are unable to accommodate relative movement between the shafts in the direction of the length thereof.

According to the present invention a flexible coupling for connecting two rotatable components comprises at least four resilient bushes uniformly spaced relative to one another in a circumferential direction with respect to the axis of rotation of the coupling, each bush being mounted on a respective substantially radially extending rigid inner member, alternate inner members being adapted for connection to a respective one of said rotatable components, a respective rigid casing surrounding each bush and a respective web interconnecting the casings of alternate pairs of adjacent bushes.

The webs may be formed separately from the casings and secured thereto by any suitable means but more preferably the webs are formed integrally with the casings.

Preferably each bush is compressed between the associated casing and inner member. Such compression may be effected by forming the casing in two longitudinally split halves and pressing and joining the halves together. Alternatively the bush and associated casing may each be frusto-conical with the apex directed radially inwards and compression of the bush effected by outward axial displacement of the casing relative to the bush.

The bore of each bush may be cylindrical but is preferably tapered in the same direction as, but to a lesser degree than, the external frusto-conical surface with the associated inner rigid member being correspondingly tapered.

The inner members may extend normal to the axis of rotation of the coupling but more preferably are inclined relative to the axis of rotation, for example at an angle in the range 70° to 90°, with successive inner members being inclined at equal and opposite angles with respect to a plane normal to the axis of rotation.

Preferably alternate inner members comprise the respective arms of a spider adapted for connection to respective one of the rotatable components.

The invention will now be described in more detail, by way of example only, with reference to the accompanying drwings wherein.

Figure 1:
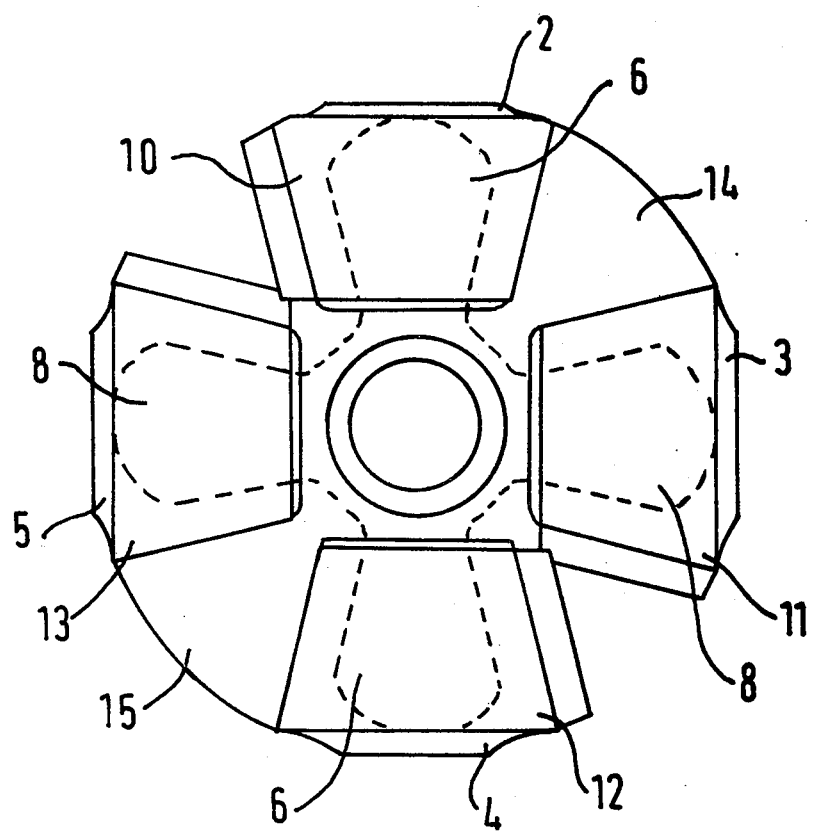
FIG. 1 is an end view of a coupling according to the present invention.
Figure 2:
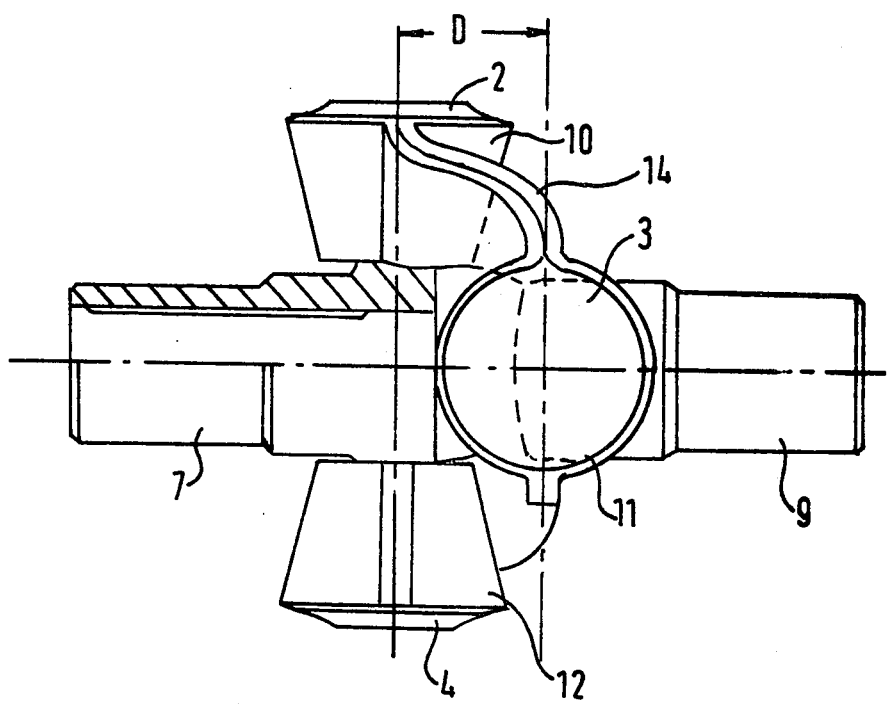
FIG. 2 is a side view of the coupling shown in FIG. 1.

The coupling 1 shown in the accompanying drawing has four similar frusto-conical rubber bushes 2,3,4 and 5 uniformly spaced relative to one another in a circumferential direction with respect to the axis of rotation of the coupling.

One pair of opposed bushes 2 and 4 is bonded to the arms 6 of a first generally T-shaped spider 7 adapted for connection to one of two rotatable components (not shown) and the other pair of opposed bushes 3 and 5 is bonded to the arms 8 of a second generally T-shaped spider 9 adapted for connection to the other of two rotatable components (not shown). As shown the arms are tapered in a radially inwards direction and the arms 6 of the spider 7 are axially spaced a distance D from the arms 8 of the spider 9 to allow axial movement between the spiders as described in more detail below.

Four similar frusto-conical metallic casing 10,11,12 and 13 are bonded to the external surfaces of the bushes 2,3,4 and 5 respectively. The casing 10 is connected to the casing 11 by a metallic web 14 integral therewith. Similarly the casing 12 is connected to the casing 13 by a metallic web 15 integral therewith and diametrically opposite the web 14. As shown the webs 14 and 15 are of curved profile to accommodate the axial spacing of the arms 6 and 8 and each web and the associated casings are split longitudinally forming two identical halves which are joined, for example by spot welding, riveting or by mechanical locking on assembly. The dimensions of the bushes and the associated casings and arms are such that the bushes are radially compressed on assembly.

In use torque forces applied to the member 7 are transmitted to the member 9 via the webs 14 and 15 connecting the casings 10,11 and 12,13 of alternate pairs of bushes and vice versa.

Axial forces applied to the spider 7 which move it towards the spider 9 are transmitted from the casings 10 and 12 via the webs 14 and 15 and generate torsional forces on the casings 11 and 13 of the spider 9, tending to rotate the latter about the axis of rotation of the coupling, which are absorbed by resilient deformation of the bushes 3 and 5 bonded to the arms of the spider 9.

Similarly conical forces applied to the spider 7 are absorbed by resilient deformation of the bushes 3 and 5.

The invention is not restricted to the above-described coupling which may be modified in a number of ways, for example, the arms 6 and 8 of the spiders 7 and 9 respectively may be inclined relative to the axis of rotation of the coupling whereby the axial distance D between the bushes 2 and 4 of the spider 7 and the bushes 3 and 5 of the spider 9 may be substantially reduced such that the centres of the bushes lie in a common plane transverse to the axis of rotation of the coupling. The same result may be achieved while maintaining the bushes substantially normal to the axis of rotation of the coupling by forming each of the arms 6 and 8 in two integral parts angled relative to one another.

Figure 3:
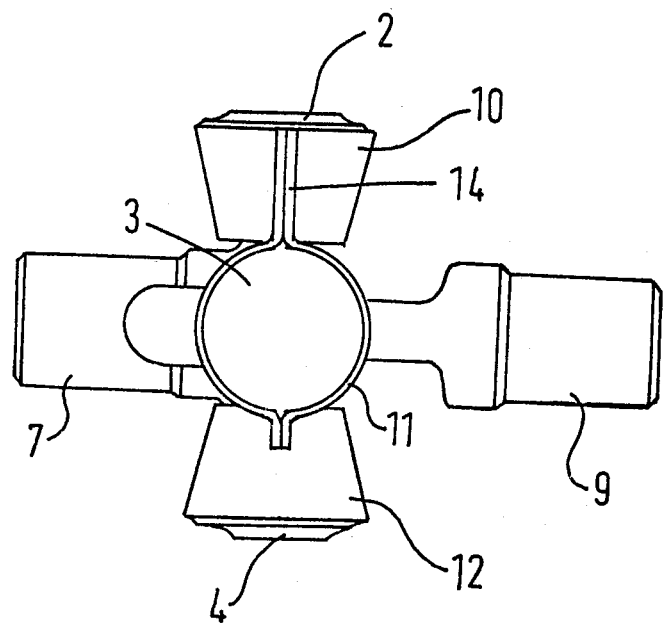
FIG. 3 is a view similar to FIG. 2 but showing an embodiment where the centers of all the bushes lie in a common plane.
Figure 4:
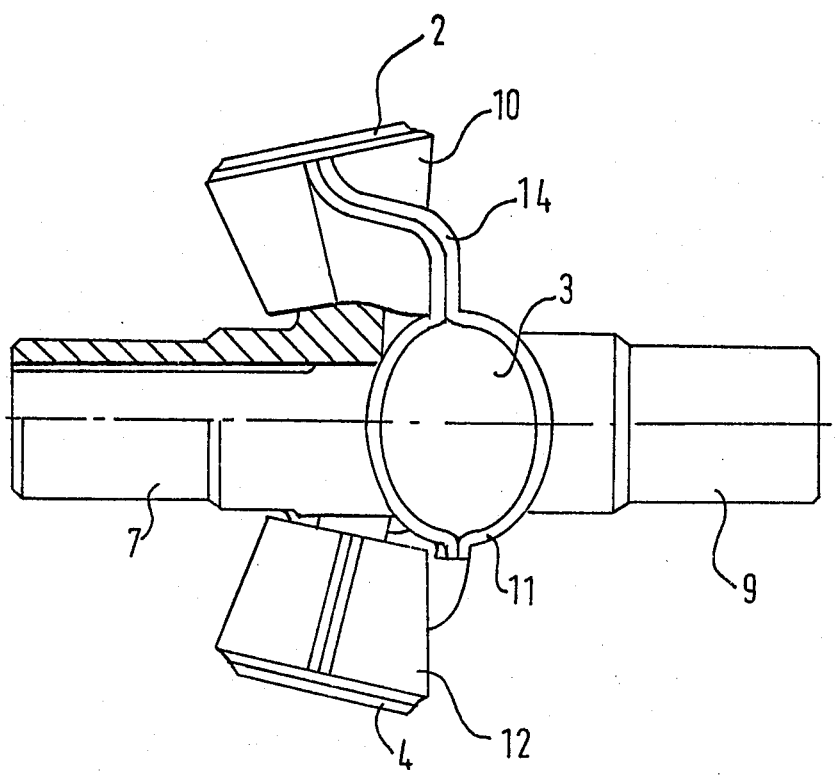
FIG. 4 is a view similar to FIG. 2 but showing an embodiment where the inner members are inclined.
Figure 5:
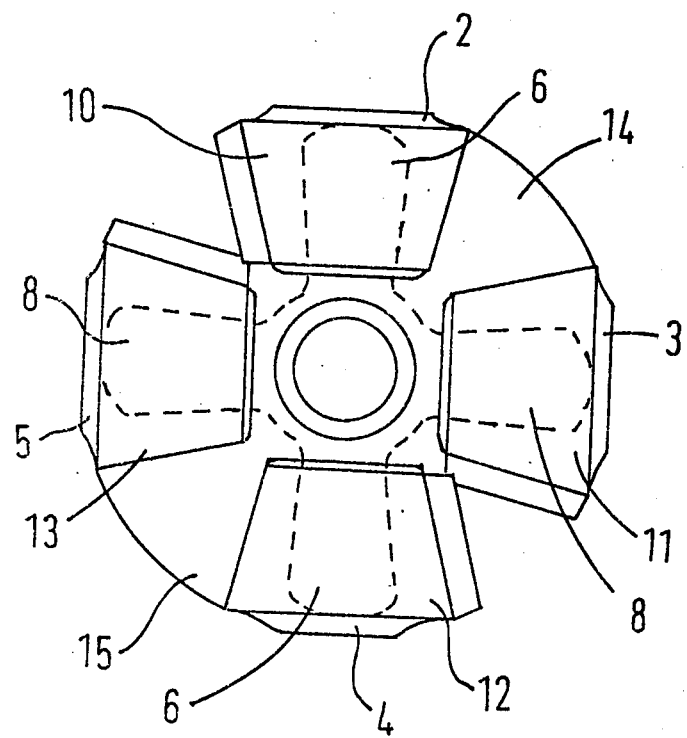
FIG. 5 is a view similar to FIG. 1 but showing an embodiment where the bore of each bush is tapered to a lesser extent than the external surface of the bush.

FIG. 3 shows a modified form of the invention in which the center of each bush lies in a common plane transverse to the axis of rotation of the coupling, and FIG. 4 shows a further modified construction in which the inner members are inclined relative to the axis of rotation of the coupling, successive inner members being inclined at equal and opposite angles, in the range 70° to 90°, with respect to a plane normal to the axis of rotation of the coupling. In FIG. 5 there is shown a modified form of the invention wherein each bush has an internal bore tapered in the same direction as the external frusto-conical surface and the associated inner rigid member is correspondingly tapered.

The number of bushes may be increased provided there is always an even number for example there may be six or eight bushes uniformly spaced in a circumferential direction with each spider having an appropriate number of arms.

Having now described my invention—what I claim is:

1. A flexible coupling for connecting two rotatable components comprising at least four substantially radially extending rigid inner members uniformly spaced relative to one another in a circumferential direction with respect to the axis of rotation of the coupling, a resilient bush mounted on each said rigid inner member, circumferentially alternate inner members being connected to one of said rotatable components, the other inner members being connected to the other rotatable component such that the same number of bushes is associated with each of the rotatable components, a rigid casing surrounding each bush and a web interconnecting adjacent pairs of said casings such that each one of said bushes on one rotatable component is connected only to an adjacent one of said bushes on the other rotatable component and so that relative axial movement of the rotatable components is resisted resiliently by the torsional loading of the resilient bushes.

2. A coupling according to claim 1 wherein said webs are integral with the associated casings.

3. A coupling according to claim 1 wherein each bush is compressed between the associated casing and inner member.

4. A coupling according to claim 1 wherein the center of each bush lies in a common plane transverse to the axis of rotation of the coupling.

5. A coupling according to claim 1 wherein the bushes adapted for connection to one of said rotatable components are axially spaced from the bushes adapted for connection to the other of said rotatable components.

6. A coupling according to claim 1 wherein alternate inner members comprise the respective arms of a spider adapted for connection to a respective one of said rotatable components.

7. A coupling according to claim 1 wherein said inner members extend normal to the axis of rotation of the coupling.

8. A coupling according to claim 1 wherein said inner members are inclined relative to the axis of rotation of the coupling, successive inner members being inclined at equal and opposite angles with respect to a plane normal to the axis of rotation of the coupling.

9. A coupling according to claim 8 wherein the angle of inclination of said inner members lies in the range 70° to 90° relative to the axis of rotation of the coupling.

10. A coupling according to claim 1 wherein each casing comprises two longitudinally split halves.

11. A coupling according to claim 1 wherein each bush and associated casing is of frusto-conical shape with the apex directed radially inwards.

12. A coupling according to claim 11 wherein each bush has an internal bore tapered in the same direction as the external frusto-conical surface and the associated inner rigid member is correspondingly tapered.

13. A coupling according to claim 12 wherein the bore of each bush is tapered to a lesser degree than the external frusto-conical surface thereof.

14. A coupling according to claim 1 comprising four bushes.

* * * * *